(12) United States Patent
Bhatia et al.

(10) Patent No.: US 6,687,495 B2
(45) Date of Patent: Feb. 3, 2004

(54) METHOD AND SYSTEM FOR SUPPORTING DIFFERENTIATED NETWORK SERVICE FOR MOBILE CUSTOMERS AND APPLICATIONS

(75) Inventors: Randeep Bhatia, Green Brook, NJ (US); Jorge Lobo, New York, NY (US); Guda Venkatesh, West Orange, NJ (US); Alan Quayle, Berkely Heights, NJ (US)

(73) Assignee: Teltier Technologies, Inc., Clark, NJ (US)

( * ) Notice: Subject to any disclaimer, the term of this patent is extended or adjusted under 35 U.S.C. 154(b) by 0 days.

(21) Appl. No.: 10/289,169

(22) Filed: Nov. 6, 2002

(65) Prior Publication Data

US 2003/0087649 A1 May 8, 2003

Related U.S. Application Data

(60) Provisional application No. 60/345,171, filed on Nov. 7, 2001.

(51) Int. Cl.[7] .............................. H04M 3/42; H04Q 7/20
(52) U.S. Cl. ................. 455/414.1; 455/433; 455/435.1; 455/456.1
(58) Field of Search .......................... 455/414.1, 414.2, 455/414.3, 433, 435.1, 456.1, 456.2, 456.3, 456.5, 457

(56) References Cited

U.S. PATENT DOCUMENTS

| 5,983,109 | A | 11/1999 | Montoya ................... 455/456 |
|---|---|---|---|
| 6,058,303 | A | 5/2000 | Astron et al. ................ 455/413 |
| 6,456,854 | B1 * | 9/2002 | Chern et al. ................ 455/457 |
| 6,505,046 | B1 * | 1/2003 | Baker ....................... 455/456.3 |
| 6,505,050 | B1 | 1/2003 | Brudos et al. .............. 455/458 |

* cited by examiner

Primary Examiner—Quochien Vuong
(74) Attorney, Agent, or Firm—Walter W. Duft

(57) ABSTRACT

A method and a system are disclosed for obtaining the dynamic network state of mobile subscribers, such as subscriber location, presence or other state information. This information, which may be distributed within various core mobile network elements, is obtained via a differentiated network service gateway (DNSG) that interfaces with the mobile network elements in a manner that accommodates the network's operator enforced controls and limitations. The DNSG implements service level agreements (SLAs) that support differentiated quality-of-service (QoS) in terms of accessing the dynamic network state of the mobile subscribers. The consumers (DNSG clients) of the dynamic network state information may include applications that provide communication and transactional services to mobile subscribers based on their network state, and the mobile subscribers themselves. The consumers register with the DNSG for SLAs to obtain a desired QoS that determines the precision and speed at which the network service functions for their exclusive use. The DNSG uses the SLAs to allocate available resources to the consumers and for scheduling queries to the core network elements so as to obtain the network state of the mobile subscribers according to the requirements of the SLAs.

21 Claims, 11 Drawing Sheets

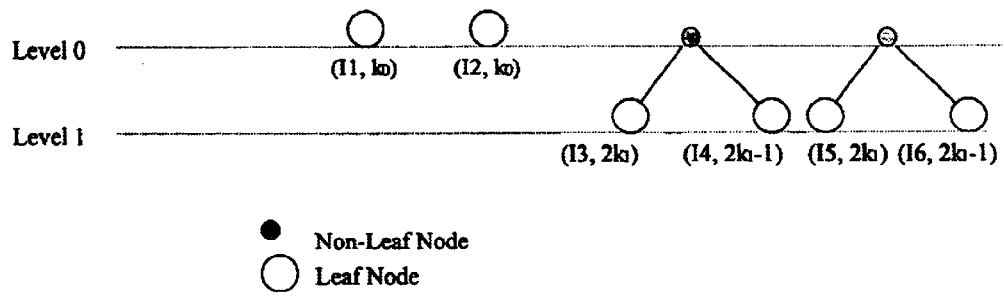
FIG. 12
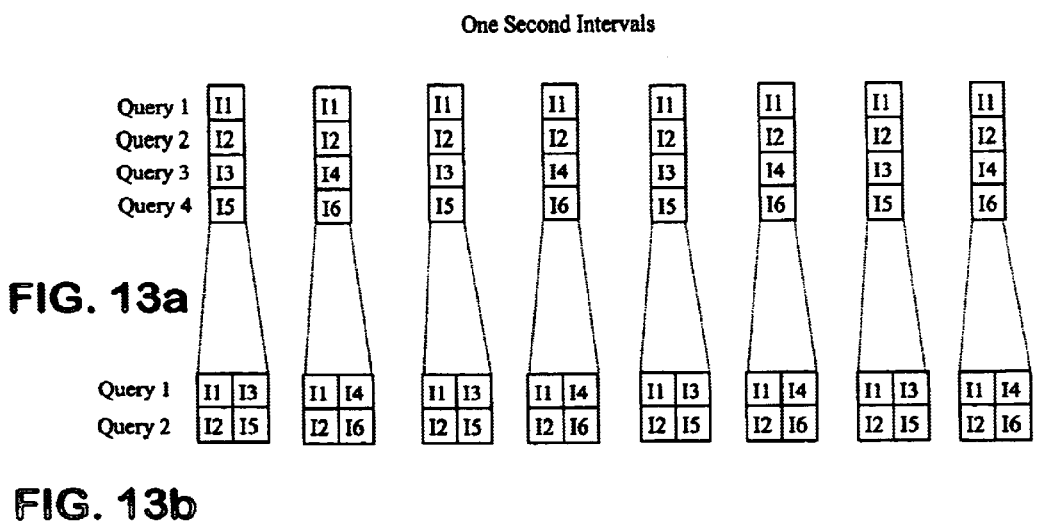
FIG. 13a
FIG. 13b

METHOD AND SYSTEM FOR SUPPORTING DIFFERENTIATED NETWORK SERVICE FOR MOBILE CUSTOMERS AND APPLICATIONS

CROSS REFERENCE TO RELATED APPLICATIONS

This application claims the benefit under 35 U.S.C. 119(b) of U.S. Provisional Patent Application Serial No. 60/345,171, filed on Nov. 7, 2001, entitled "Method and System for Supporting Differentiated Network Service For Mobile Customers And Applications."

BACKGROUND

1 Field of Invention

This invention relates to services offered to application providers and subscribers of mobile networks. In particular, the invention pertains to access methods for mobile networks.

2 Description of Prior Art

Mobile networks support large numbers of mobile subscribers who are able to receive services on the move. These include basic services such as voice calls, and they also include more advanced services such as Internet access, mobile commerce, location based content delivery, etc. A mobile network typically maintains the dynamic network state, including location and presence, of millions of mobile subscribers. In order to support this large number of mobile subscribers, existing mobile networks are divided into a number of separate operational entities called Public Land Mobile Networks (PLMN). Typically, the coverage area of a PLMN is confined within the boundaries of a single country. Also, a single country may have many PLMNs with overlapping coverage areas. A mobile subscriber typically subscribes to a single PLMN. The specific PLMN is called the home PLMN of the subscriber. The subscriber may also obtain mobile services from other PLMNs (called visited PLMN) while on the move. This involves communication between the visited PLMN and the home PLMN of the subscriber.

In order to route calls and services to mobile subscribers, a mobile network must memorize for each subscriber whether she is known to be in some place or not (registered with the network), and if so, the location area (including the PLMN) where she is currently located. This is achieved by storing in a database the identity of each mobile subscriber together with an indication on whether or not she is registered, and if so, where the subscriber can be found. The Home Location Register (HLR) in the home PLMN of the mobile subscriber is such a database. In addition to storing the dynamically changing network state of the mobile subscriber, the HLR is also the repository for some relatively static information for the subscriber, such as subscribed services, authentication parameters etc. Another mobile network database is responsible for temporarily maintaining subscriber information (both static and dynamic) in order to reduce network signaling by keeping it close to the subscriber when the subscriber is roaming. This database is the Visited Location Register (VLR). Subscriber data is kept synchronized between the HLR and the VLR by exchange of mobility messages.

In order to support location based emergency services, mobile networks are being enhanced to provide subscriber location information accurate to within several meters. This information is also being utilized for providing location-based services to mobile subscribers, where, based on their location, highly relevant local content is made available, such as information about nearby shops and restaurants, etc. The location enabling entities in a mobile network conventionally include Location Measurement Units (LMU) or Position Determination Equipment (PDE) that provide measurements regarding a mobile station's (subscriber's) current location. A Serving Mobile Location Center (SMLC) controls the overall location procedure for each mobile station by instigating location-related measurements. The SMLC computes mobile station (subscriber) position from the resulting measurements and returns the final location estimate to the requesting entity. A Gateway Mobile Location Center (GMLC) supports interfaces to external clients to provide to them the mobile station's position. The GMLC itself interfaces with the HLR and the VLR to determine the current SMLC for the mobile station, and uses that SMLC to obtain the location estimate for the subscriber.

Mobile network operators are beginning to realize that the dynamic state of mobile subscribers within mobile networks is a highly valuable resource that can be tapped to provide value-added services. However, much of this resource is located deep within the networks and is distributed within closed and propriety network elements, making it virtually impossible for new services that access the resource to be built rapidly and effectively. Motivated by the potential windfall to be obtained by permitting access to mobile subscriber dynamic state information, mobile network operators are beginning to open up their networks by making interfaces into the network elements (e.g., GMLCs, HLR/VLR) available to entities that may host third party applications. Standards bodies such as LIF (Location Interoperability Forum) and 3GPP ($3^{rd}$ Generation Partnership Project) are getting involved in formulating standards for these interfaces to the network elements, including GMLCs and HLR/VLRs. It is thus now becoming possible for external entities to query mobile networks to obtain the dynamic network state of the mobile subscribers.

One of the biggest concerns that mobile network operators have regarding opening up their networks, is the potential impact on existing services that form the core revenue source for such entities. They are concerned, for example, that a rogue application may inundate the mobile networks with user status queries, thereby bringing the core network services to a grinding halt where not even standard voice services can be supported.

SUMMARY OF THE INVENTION

The invention address the foregoing concerns by providing a method and system for obtaining the dynamic network state of mobile subscribers, such as subscriber location, presence, or other state information. This information, which may be distributed within various core mobile network elements, can be obtained via a differentiated network service gateway (DNSG) that interfaces with the mobile network elements in a manner that accommodates the mobile network's operator enforced controls and limitations. To that end, the DNSG implements service level agreements (SLAs) that support differentiated quality-of-service (QoS) in terms of accessing the dynamic network state of the mobile subscribers. The consumers (DNSG clients) of the dynamic network state information may include applications that provide communication and transactional services to mobile subscribers based on their dynamic network state, and the mobile subscribers themselves. These consumers register with the DNSG for SLAs to obtain a desired QoS that determines the precision and speed at which the network service functions for their exclusive use. The DNSG uses the SLAs to allocate available server resources to the consumers and for scheduling queries to the core network elements so as to obtain mobile subscriber dynamic network state information according to the requirements of all of the SLAs.

BRIEF DESCRIPTION OF THE DRAWINGS

FIG. 12 is a diagram of another logical binary tree generated by the GLS server within the DNSG of FIG. 1.

FIGS. 13a and 13b are tabular illustrations of a mobile network query schedule corresponding to the binary tree of FIG. 12.

DETAILED DESCRIPTION OF THE PREFERRED EMBODIMENT

Overview

Figure 1:
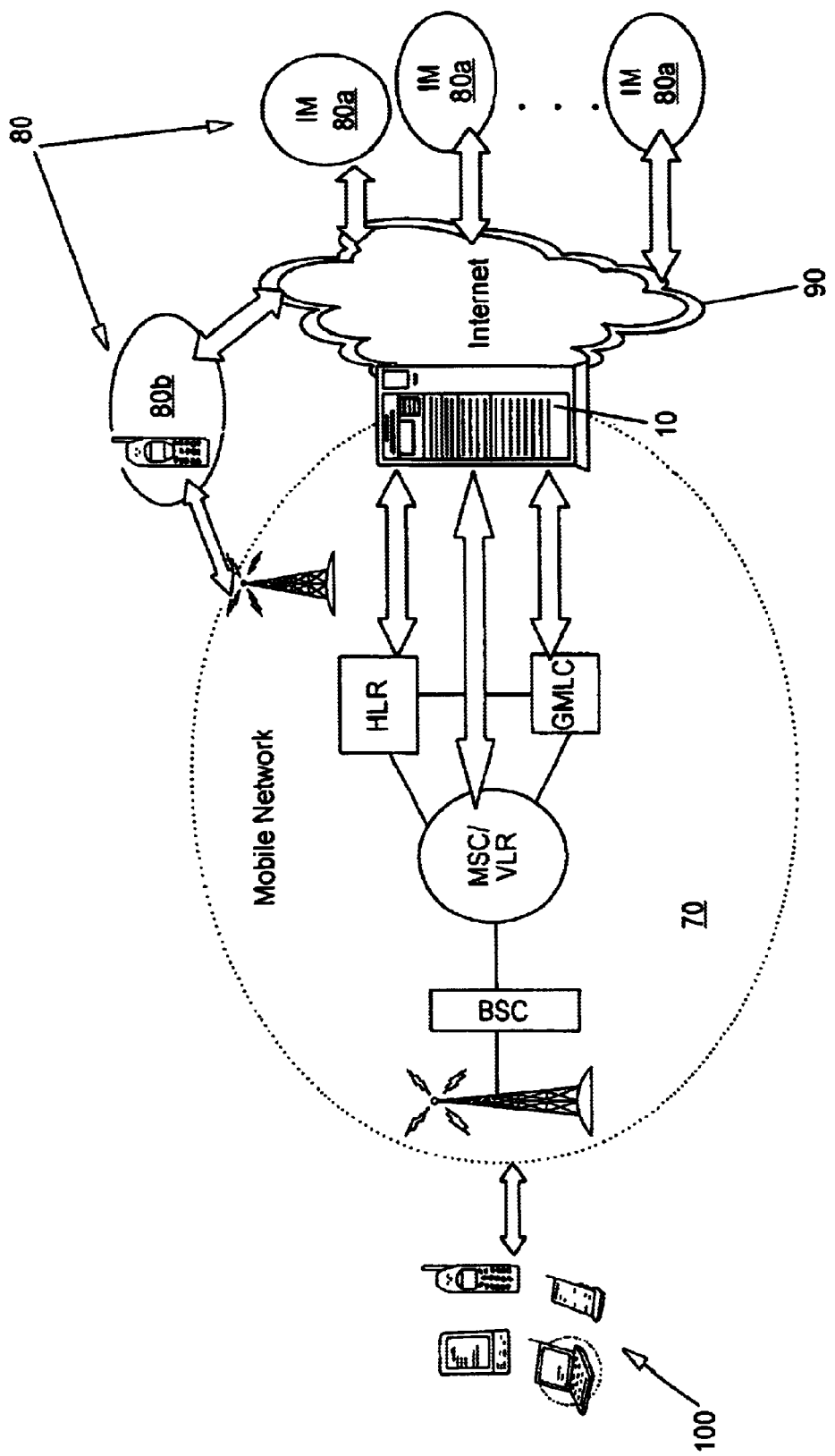
FIG. 1 is a network topology view showing a DNSG arranged in an operational environment.

The following description begins with reference to FIG. 1, which illustrates a Differentiated Network Services Gateway (DNSG) (10) that is adapted to provide differentiated network service for mobile customers and applications in accordance with the invention. The DNSG (10) is a programmed data processing resource that has access to various core elements of a mobile telecommunication Network (70) (e.g. HLR, GMLC, MSC, VLR etc.) and is able to query such elements in order to obtain the dynamic network state of mobile subscribers (100) and make this information available to DNSG clients (80). The DNSG (10) may be hosted on any suitable data processing platform situated between the DNSG clients (80) requesting the dynamic state of the mobile subscribers (100), and the elements of the mobile Network (70). For example, the platform hosting the DNSG (10) may have a first network interface connecting the DNSG to the DNSG clients (80) via the Internet (90) and a second network interface connecting the DNSG to the core elements of the mobile Network (70) via the mobile network infrastructure.

There may be several categories of DNSG clients (80) who are the consumers of the network service provided by the DNSG (10), including DNSG mobile application service provider clients (80a), and DNSG mobile subscriber clients (80b). The former represent applications that provide value-added communication and transactional services to the mobile subscribers (100). Examples include Instant Messaging (IM) applications and Content Delivery applications. By way of example, an IM application may utilize the network presence of a mobile subscriber (100) to provide a richer IM (Instant Messenger) experience or by delivering targeted and focused content (e.g. coupons) based on the mobile subscriber's current location. The DNSG mobile subscriber clients (80b) represent mobile subscribers (100) who desire to obtain their own dynamic network state. Mobile subscribers (100) may wish to do this, for example, in order to use their current location to obtain information about nearest restaurant, shops etc., from a Nearest Facility Locator (NFL) application (e.g. MapQuest, Vicinity) which may not be registered as a DNSG mobile application service provider client (80a).

DNSG clients (80) desiring to obtain the dynamic network state of mobile subscribers (100) will register for such service with the DNSG (10). Registration may be performed via the Internet (90), or in any other suitable fashion. In order to obtain the dynamic network state of a mobile subscriber (100), the DNSG client (80) must also receive authorization from the mobile subscriber. Once this authorization is obtained, the registered DNSG client (80) can request the DNSG (10) to interface with the network elements in the mobile Network (70) (e.g. HLR, GMLC, MSC, VLR etc.) to obtain the dynamic network state of the mobile subscribers (100) and make this information available to the DNSG client.

A requirement of the DNSG (10) as it interfaces with the core elements of the mobile Network (70) is that it be able to work with the operator enforced controls and limitations for each of the interfaced elements. The DNSG (10) has limited resources in terms of the available bandwidth into the mobile Network (70). Under these limited conditions, it may not be feasible for the DNSG (10) to provide the dynamic user status of millions of subscribers (100) with the highest quality-of-service (QoS) for every request. However, the DNSG (10) can be implemented to support differentiated service levels such that the DNSG is able to provide the dynamic network state of some mobile subscribers (100) with greater precision and speed than for other subscribers (100), or where the DNSG is able to provide some DNSG clients (80) a higher QoS then other DNSG clients. The DNSG (10) may thus offer graded levels of service for obtaining the dynamic state of mobile subscribers (100) where different DNSG clients (80) are offered different grades of service according to their willingness to pay for the offered service levels. In addition, there may be a mismatch in the rate at which the DNSG (10) needs to serve queries from the DNSG clients (80) and the rate at which the DNSG is allowed and able to query the mobile Network (70) for the dynamic network state of the mobile subscribers (100). For example, the DNSG (10) may be asked to serve DNSG client queries at a higher rate then the rate it can query the core network elements.

In light of the foregoing requirements, the DNSG (10) preferably has the following features:

Implements SLAs (Service Level Agreements) for DNSG clients (80). These SLAs define the QoS delivered by the DNSG (10) for providing a mobile subscriber's dynamic network state to the DNSG clients (80). The QoS is defined in terms of the precision and speed at which the mobile DNSG (10) functions for the exclusive use of the DNSG clients (80). Specifically, each SLA defines the speed or latency (delay) with which a DNSG client's query for the dynamic network state of a mobile subscriber (100) must return and the precision in terms of the age (how old) of the obtained network state information.

Allows for setting up several classes of SLAs offering different guarantees. Two such SLA classes are disclosed by way of example herein. The first class of SLA service guarantees a predetermined delay and age for any request of data governed by this type of agreement. Within this guaranteed class of service, the DNSG (10) can make QoS differentiations based on the age of the data returned. The delay in serving queries for this class of service is independent of the operator imposed controls and limitations. Also, for this class of service, the DNSG (10) provides the guarantee that all SLAs are honored irrespective of the consumer demand, as long as the operator-imposed controls do not change with time. The second class of SLA is used to offer a service that may degrade with increase in demand. In this non-guaranteed class of SLAs, it is guaranteed that overall increases in the number of requests coming from DNSG clients (80) with equal quality of service agreements can only deteriorate the performance of other DNSG clients with lower quality of service agreements. That is, the DNSG (10) ensures that the service of a DNSG client (80) is never affected by the demands of other DNSG clients with lower quality of service agreements; only increased request activity by other DNSG clients with a higher or equal grade of SLAs will affect a given DNSG client's service. The first class of SLAs may be referred to as Guaranteed Level Services (GLS) and the second class may be referred to as Differentiated Best Services (DBS).

For DBS SLAs, the DNSG (10) guarantees that if there are two DNSG client requests, one with higher priority than the other, and if a query to the mobile Network (70) is issued for the DNSG client request with a lower priority SLA at a time instance when there was a choice to serve either of the two requests, then it must be the case that the DNSG client request with higher priority SLA is also served by the DNSG (10), either from its cache (described below) or from the mobile Network (70) (by issuing a network query).

There are two additional ways that SLAs can be enforced in such a setting. One possibility is for the SLA to be enforced at the level of DNSG mobile application service provider clients (80a). This means that all transactions for a DNSG mobile application service provider client (80a), irrespective of the mobile subscribers (100) on whose behalf the transactions are made, get the same service level. The other possibility is when the DNSG mobile application service provider clients (80a) themselves offer graded levels of service to the mobile subscribers (100), so that a transaction of a DNSG mobile application service provider client for one of its mobile subscribers may get a different service level than another transaction of the DNSG mobile application service provider for a different mobile subscriber. In the former case, the SLA is for the DNSG mobile application service provider client (80a) and in the latter case it is for the mobile subscriber (100). The DNSG (10) preferably supports both types of SLAs.

Supports operator-enforced controls and limitations for each of the interfaced core network elements. The DNSG (10) works with the limited resources in terms of the available bandwidth into the mobile Network elements. For these limited resources the DNSG (10) is implemented to support differentiated service levels (as defined earlier) where the DNSG is able to provide the dynamic network state of some mobile subscribers (100) with a greater precision and speed than for other mobile subscribers.

Hides the underlying resource limitations regarding available bandwidth into the mobile Network elements from the DNSG clients (80). The service level provided to the DNSG client (80) for obtaining the dynamic network state of a mobile subscriber (100) is based only on the SLA and not on the operator-enforced controls on interfacing with the mobile Network (70).

Allows for aggregation of DNSG client requests where multiple overlapping DNSG client requests for the dynamic state of the same mobile subscriber (100) result in single query to the underlying mobile Network 70).

Summarizing the foregoing, an SLA offered by the DNSG (10) is defined by three pieces of information, its type, the maximal delay d that the SLA guarantees for a query to obtain the dynamic network state for a mobile subscriber (100), and the age A in seconds of the obtained state that will be acceptable from the time requested. There are two exemplary types of SLAs that are offered by the DNSG (10) embodied in the present description: A first class of Guaranteed Level Services (GLS) SLAs and the second class of Differentiated Best Services (DBS) SLAs. The GLS SLAs offer absolute guarantees while the DBS SLAs provide relative guarantees. The DBS SLAs are associated with a priority, such that DBS SLAs with a higher priority are provided preferential treatment. During registration and authorization of a DNSG client (80), the DNSG client will register a GLS or DBS SLA with the DNSG (10) for obtaining the mobile subscriber's dynamic network state according to the QoS (Quality of Service) offered by the SLA. An SLA for a given DNSG client (80) may be the same for all mobile subscribers (100), or it may be different for different mobile subscribers for the given DNSG client (80). A feasibility check can be made by the DNSG (10) to ensure that the SLA requested by the DNSG client (80) can be honored, and if deemed infeasible the request may be turned down. Thus, at any given time, the DNSG client (80) is able to obtain from the DNSG (10) the dynamic network state of one or more mobile subscribers (100), each of whom has authorized the DNSG client (80), and for each such mobile subscriber an SLA is guaranteed to the DNSG client (80) by the DNSG (10). The DNSG (10) maintains for each DNSG client (80) the set of mobile subscribers (100) whose dynamic network state it can obtain and the SLA for each such mobile subscriber for the DNSG client (80).

Registration of DNSG Clients

Figure 2:
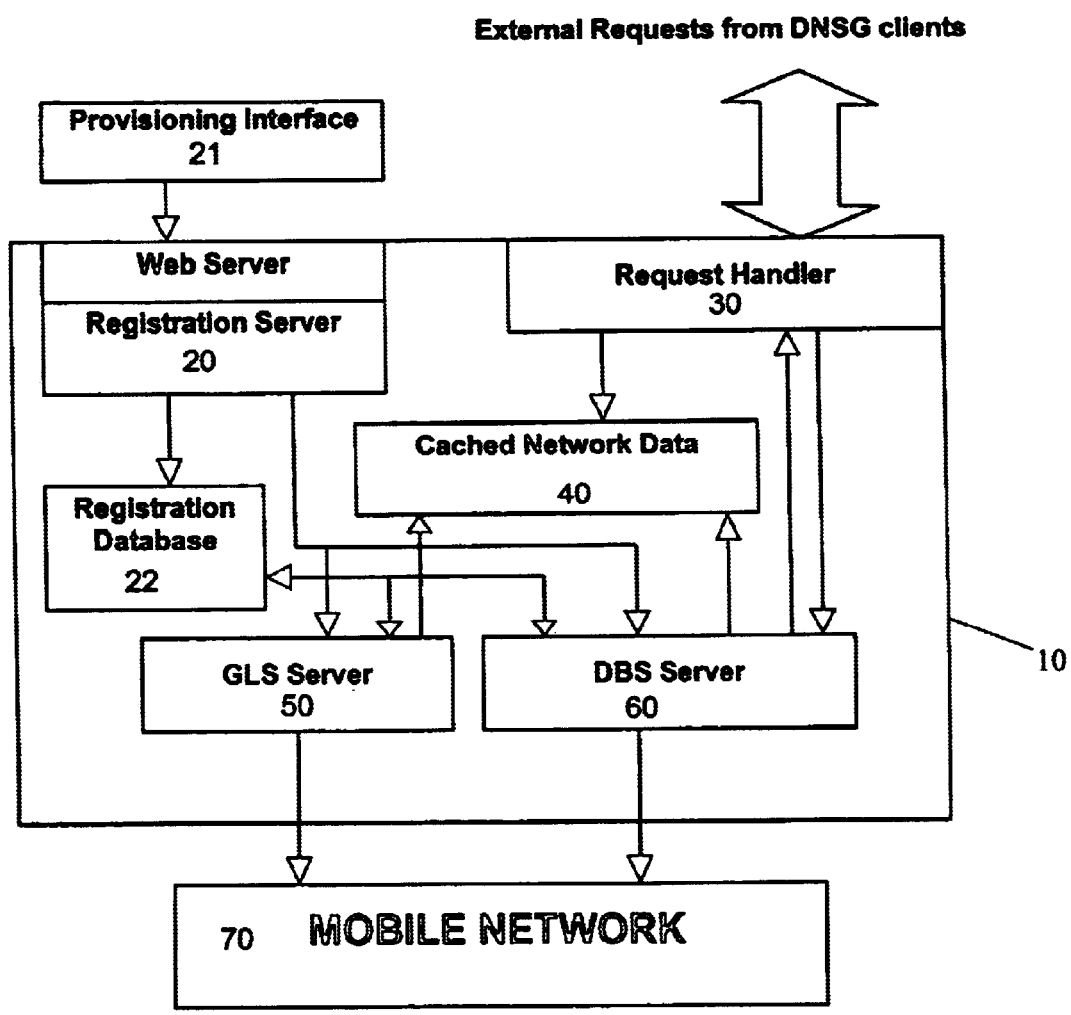
FIG. 2 is a functional block diagrammatic view showing components of the DNSG of FIG. 1.

Turning now to FIG. 2, DNSG clients (80) use a provisioning process to register with the DNSG (10) to obtain the dynamic network state of mobile subscribers (100). This registration can be done using a world wide web based Provisioning Interface (21) that is made available on the DNSG (10). In particular, the DNSG (10) can host the Provisioning Interface (21) on a web server that runs on the host processing platform of the DNSG (10). On the back end, the web server will connect with a Registration Server (20) of the DNSG (10). All provisioned information is kept persistent in a Registration Database (22) of the DNSG (10).

There can be at least three kinds of provisioning. One is the provisioning of a DNSG application service provider client (80a) (which will typically be an application service provider to one or more mobile subscribers (100)). The second kind of provisioning involves registration of a DNSG mobile subscriber client (80b) (who will typically be an application service consumer of a DNSG application service provider client (80a)). Finally, a registered mobile subscriber (100) is able to authorize a provisioned DNSG client (80) to obtain the mobile subscriber's dynamic network state for a given SLA selected by the mobile subscriber. This SLA will typically correspond to a service agreement between a DNSG mobile subscriber client (80b) (the application service consumer) and a DNSG application service provider client (80a) (the application service provider).

In general, if the DNSG (10) accepts the registration of a DNSG client (80), and the client is authorized by a mobile subscriber (100) (or if the client is the mobile subscriber), the DNSG client can start soliciting the network state of the mobile subscriber from the DNSG.

Figure 3:
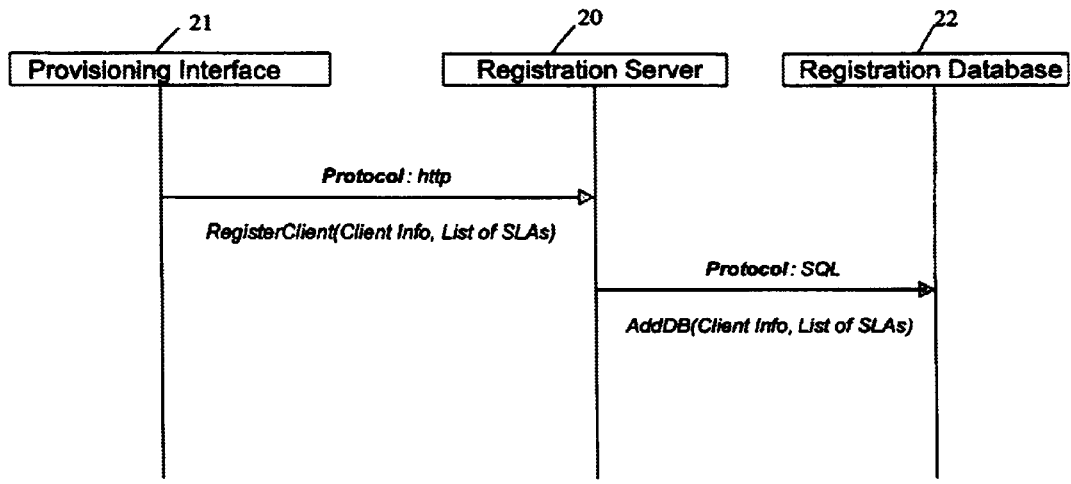
FIG. 3 is a flow diagram showing one aspect of DNSG client provisioning.

The flow for provisioning a DNSG application service provider client (80a) is shown in FIG. 3. Registration may be done for a single application-level SLA (referred to as a "mobile application SLA") that provides the same service level to all mobile application transactions regardless of the mobile subscriber (100) on whose behalf the transactions are made. Registration may also be done for a set of SLAs (referred to as "mobile subscriber SLAs"), each of which can be offered to a particular mobile subscriber (100) when she authorizes the DNSG application service provider client (80a) to obtain her dynamic network state. In either case, the registration information shown in FIG. 3 is stored in the Registration Database (22).

Figure 4:
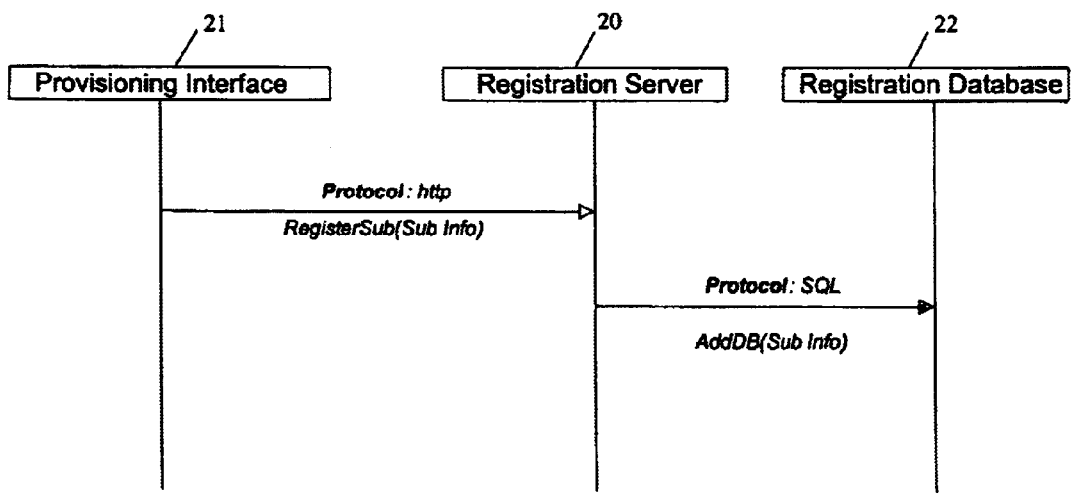
FIG. 4 is a flow diagram showing another aspect of DNSG client provisioning.

The flow for provisioning a DNSG mobile subscriber client (80b) is shown in FIG. 4. A DNSG mobile subscriber client (80b) who wishes to take advantage of the services of the DNSG (10) provisions herself by providing subscriber information via the Provisioning Interface (21) to the Registration Server (20), which stores the information in the Registration Database (22). Once provisioned in this manner, the DNSG mobile subscriber client (80b) is able to select an SLA and authorize other provisioned DNSG clients (80) to obtain the subscriber's own dynamic network state.

Figure 5:
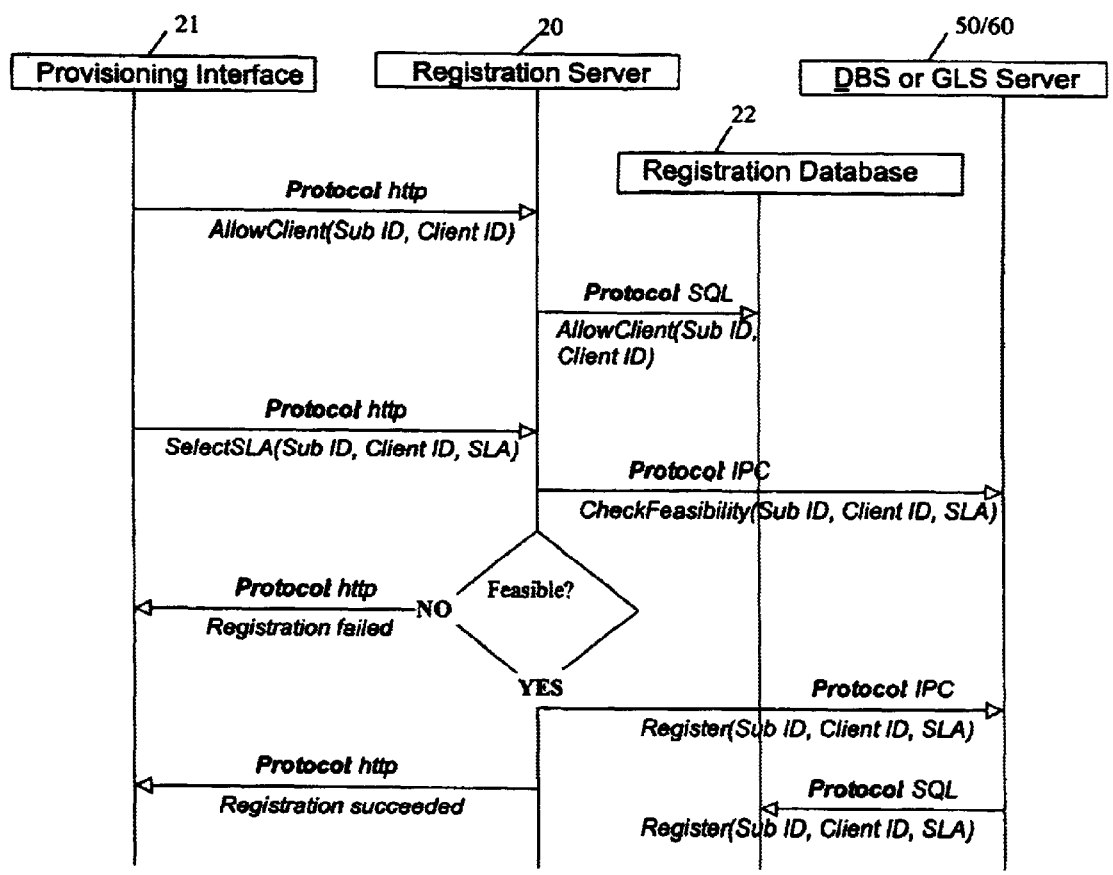
FIG. 5 is a flow diagram showing still another aspect of DNSG client provisioning.

The third form of provisioning is also done via the Provisioning Interface (21). The flow for this provisioning is shown in FIG. 5. First, the mobile subscriber (100) authorizes a DNSG client (80) to obtain the subscriber's dynamic network state. This information is stored in the Registration Database (22). Next, the mobile subscriber (100) chooses an SLA for the DNSG client (80). If the mobile subscriber (100) selects a GSL SLA, a resource check for GSL SLA service is made based on the feasibility conditions described later in the section for the implementation of the GSL SLA server (60). The DBS server (50), on the other hand, accepts all requests for DBS SLAs. If there are enough resources, the Registration Server (20) accepts the registration and sends the registration information to the appropriate SLA server, i.e. to the GSL Server (50) if the registration was for a GSL SLA and to the DBS Server (60) if the registration was for a DBS SLA. These servers store the registration information in the Registration Database (22). This information includes information about the DNSG client (80), the mobile subscriber (100) and the associated SLA.

Request Handling

Figure 6:
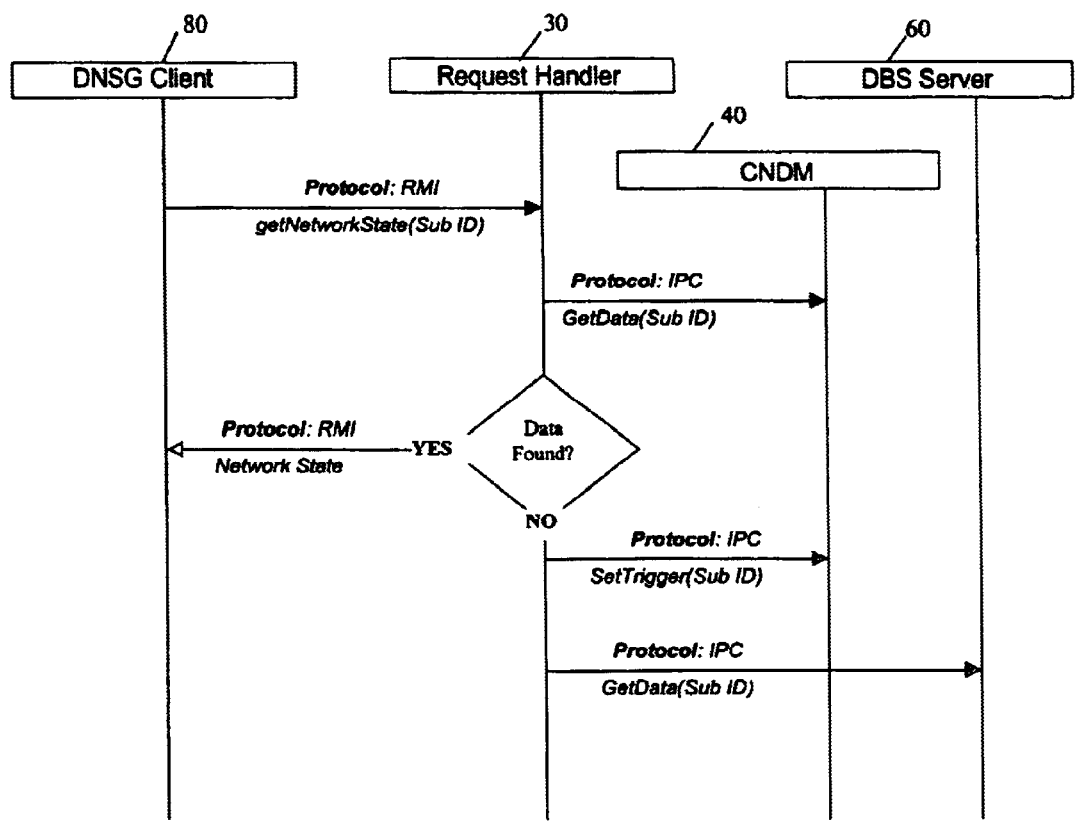
FIG. 6 is a flow diagram showing an exemplary DNSG client request handling procedure.

With continuing reference to FIG. 2, DNSG clients (80) access a Request Handler (30) to make data requests to the DNSG (10) via the Internet (90). As additionally shown in FIG. 6, when the Request Handler (30) receives a request, it goes first to the Cached Network Data Module (CNDM) (40) to get the requested data. The CNDM (40) acts as a cache of the dynamic network state of mobile subscribers (100). It can be implemented in conventional fashion in any number of ways, such as a hash table indexed by subscriber IDs (telephone numbers) associated with the mobile subscribers (100). Each CNDM cache entry includes a subscriber ID, associated dynamic network state data, and an age value (time stamp) indicating the age of the data. If the data is cached in the CNDM (40) and it has the required age (i.e., less than the maximum allowable age specified by the DNSG client (80)), it returns it to the client. As described in more detail below, this will always be the case for GLS SLAs. For DBS SLAs, the CNDM (40) may not be current enough. If it is not, the Request Handler (30) first sets a trigger in the CNDM (40) to inform the DBS Server (60) of any updates in the cache of the data requested (see below in the DBS Server Section how these triggers are used). Then, the Request Handler (30) will pass the request to the DBS Server (60), which might eventually return the data to the Request Handler (30) to pass it to the DNSG client (80). The DBS Server (60) may decide to ignore the request if it determines that it will not be able to give back the data under the available resources and operator imposed network controls for the delay limits expected by the DNSG client (80). In that case an exception is returned to the DNSG client (80).

Note that no request of a DNSG client (80) with a GLS SLA is expected to go through the GLS Server (50) (or the DBS Server (60)). Thus, sufficiently fresh data must always be available to these clients in the CNDM (40). As described in more detail below, the GLS Server (50) and the DBS Server (60) are responsible for updating the data in the CNDM (40). The GLS Server (50) is configured to always keep its data current in the CNDM (40).

To refresh cached data, the GLS Server (50) and the DBS Server (60) need to query the mobile Network (70) to get new data. However, the mobile network operator may impose some limits on the number of access requests to the network elements in any given time interval. Let us say that this limit is N queries per second. During the configuration (programming) of the DNSG (10), this number is partitioned into two groups $N_1$ and $N_2$ such that $N=N_1+N_2 \ldots N_1$ of these queries per second are allocated to the GLS Server (50) to use and $N_2$ of the queries are allocated to the DBS Server (60). The next two sections respectively describe how the DBS Server (60) and the GLS Server (50) are implemented.

The DBS Server

It is assumed that all of the DBS SLAs offered by the DNSG (10) satisfy the following feasibility condition, which should necessarily be satisfied by any system that offers a DBS SLA.

The feasibility condition refers to the earliest age that can be offered by any DBS SLA. This earliest age has to be at least as much as the maximum network latency D in obtaining the dynamic network state of a mobile subscriber (100), where the network latency is defined as the time between when the state is obtained by the mobile Network (70) and the time when it is delivered to the DNSG (10). This feasibility condition is necessary because the network latency is a lower bound on the earliest age that can be offered by any such system. Typically the network latency will be in orders of milliseconds while the age will be in order of minutes, so this is not a limiting condition. For this reason, in the following it is assumed that the network latency D will be negligible compared to the age offered in a DBS SLA.

The main constraint under which the DBS Server (60) must work is that the number of accesses to the mobile Network (70) per second must not exceed $N_2$. To enforce the DBS SLAs under this constraint, the DBS Server (60) will process the requests in the following manner.

Figure 14:
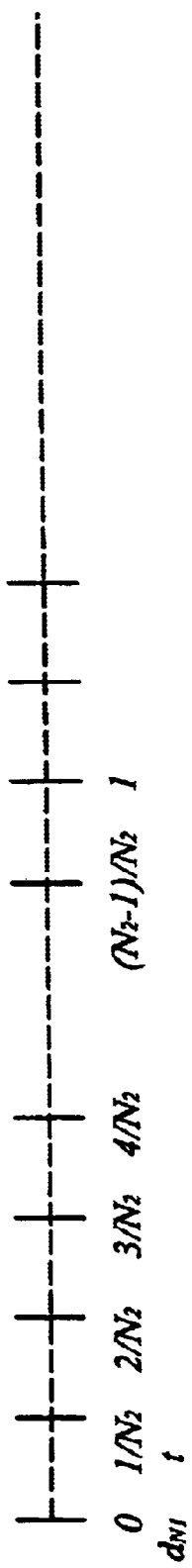
FIG. 14 is a tabular illustration of discrete time intervals that may be allocated to the DBS server for querying a mobile network.

When new requests arrive at the DBS server (60) from the Request Handler (30), they are assigned an arrival number based on their arrival time. These arrival numbers are based on division of time into discrete time intervals which are $1/N_2$ seconds apart. The first time interval (with arrival time 1) ranges from time 0 to time $1/N_2$ seconds. The second time interval (with arrival time 2) ranges from time $1/N_2$ to time $2/N_2$ seconds. The DBS server (60) issues a request to the mobile Network (70) once per each discrete time interval of size $1/N_2$ seconds. These discrete time intervals at which requests are issued to the mobile Network (70), and based on which new client requests are assigned arrival numbers by the DBS Server (60), are shown in FIG. 14.

Let D (as described earlier) in seconds be the maximal delay the mobile network operator has guaranteed for the response time to queries into the mobile Network (70). If a client query has a maximum allowable delay value of d seconds, the DBS Server (60) must perform a network query, if one is required, within d−D seconds of its arrival in order for the SLA to be honored. In other words, if the client request has arrival number i, then it must be served by the time interval which corresponds to the arrival number $i+(d-D)N_2$. If the request is not served by the time interval $i+(d-D)N_2$ then it is considered expired.

Figure 7:
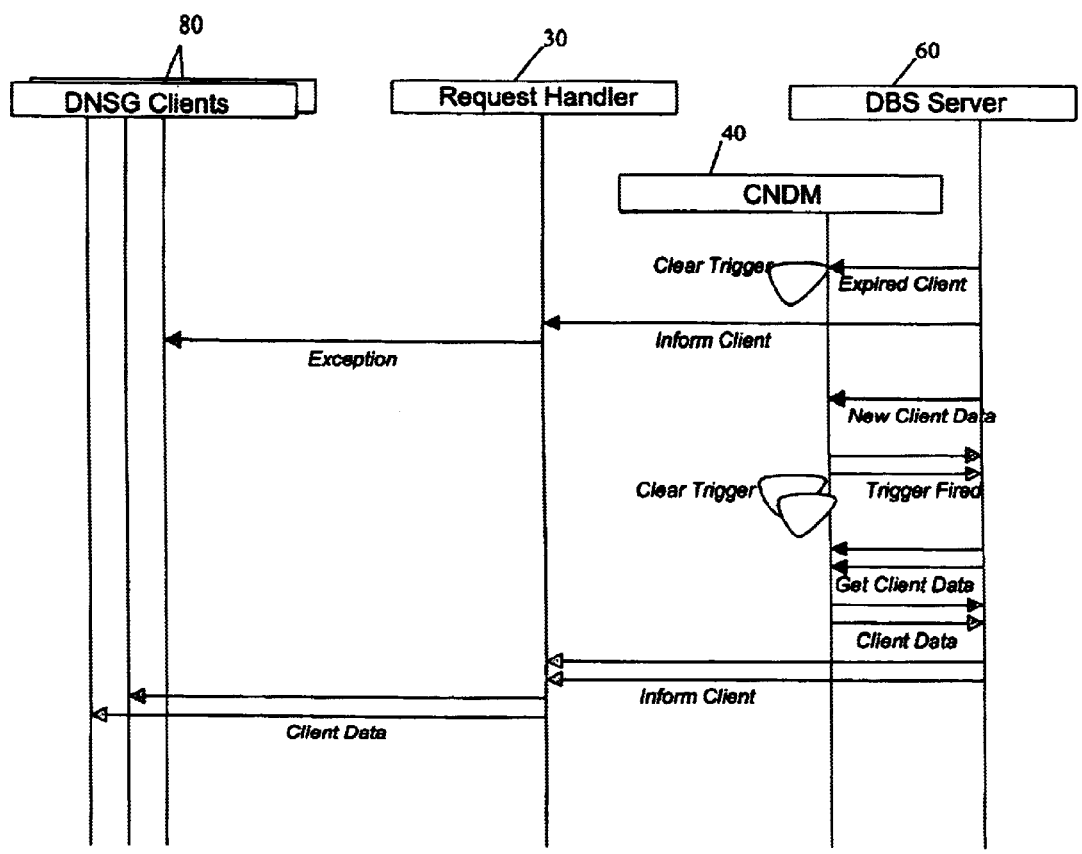
FIG. 7 is a flow diagram showing exemplary operation of the DBS server within the DNSG of FIG. 1.
Figure 8:
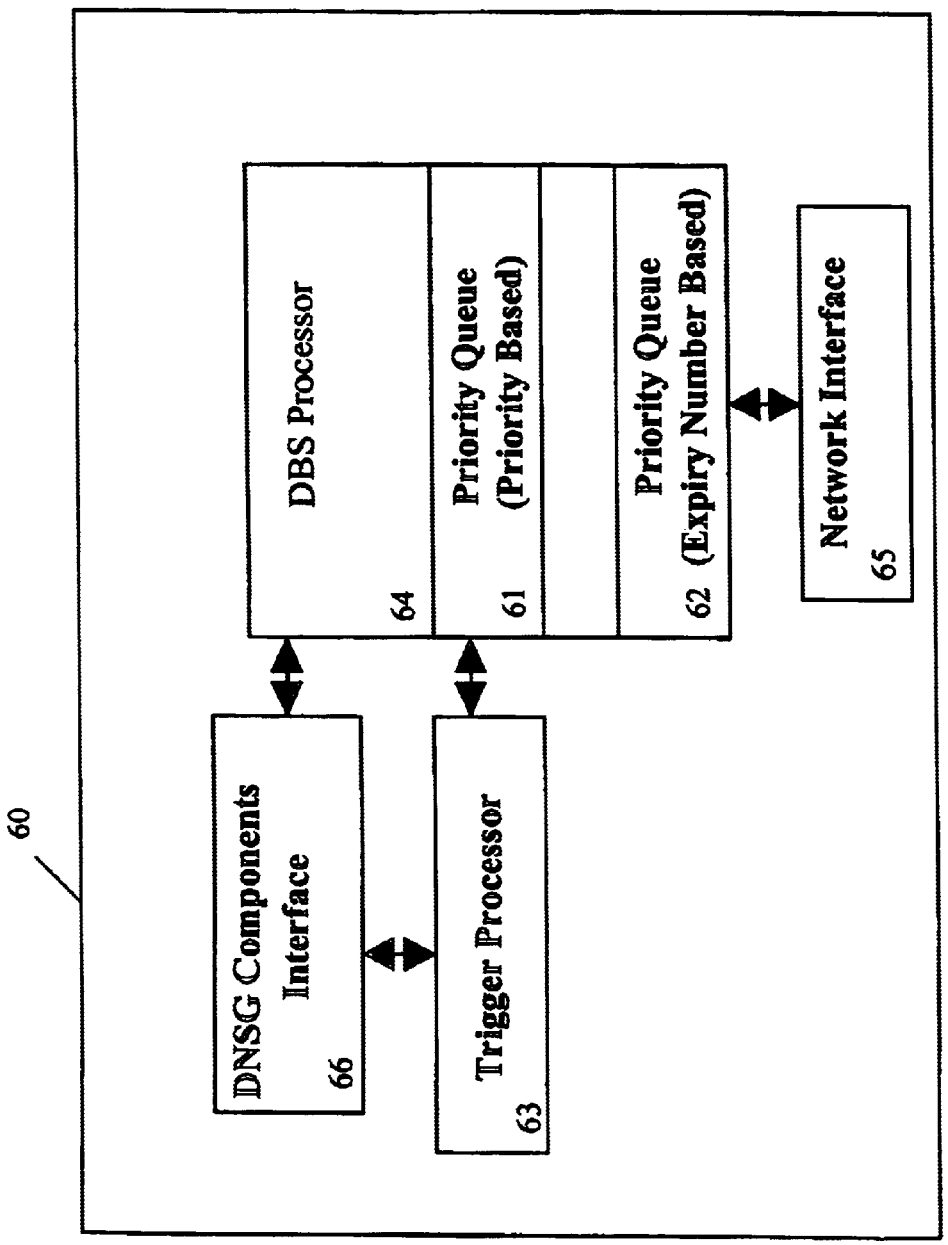
FIG. 8 is a functional block diagram showing the components of a DBS server within the DNSG of FIG. 1.

With reference now to the flow diagram of FIG. 7 and the functional block diagram of FIG. 8, the DBS Server (60) works in the manner now to be described. When client requests arrive from the Request Handler (30), they will be served according to the priority level of the SLA of the DNSG client (80) making the request (which may be based on the mobile subscriber (100) for which the request is being made). The preferred implementation of the DBS Server (60) uses a priority queue (61) to manage the client requests. The members of the priority queue (61) are arranged by the priority of the corresponding SLA. In addition, the DBS Server (60) also maintains another priority queue (62) where the client requests are arranged by their interval expiry number $(i+(d-D)N_2)$. The priority queues (60) and (61) can be implemented as a standard heap data structure with operations for extract min, extract max, insert, delete, etc.

When a new client request arrives at the DBS Server (60) (after the trigger is set up in the CNDM (40)), it is added by the DBS Processor (64) software component to the priority queue (61) and to the priority queue (62). Within a given discrete time interval (shown in FIG. 14), the DBS Processor (64) does two things. First, it performs a housekeeping function in which it consults the second priority queue (62) to figure out all the expired requests (based on the extract min operation). It then removes all the expired requests from both the priority queues (61/62) (using the delete operation). Then, as shown in FIG. 7, the DBS Processor (64) removes the triggers set up by the expired requests in the CNDM (40) via the DNSG Components Interface (66) component. This leads to an exception being thrown to the DNSG clients (80) associated with the expired requests via the Request Handler (30), thereby letting the DNSG clients know that their requests have been dropped. Note that the delete operation on the priority queues takes care of reordering the remaining data.

Next, the DBS Processor (64) component of the DBS Server (60) removes the (unexpired) request with the highest priority from the first priority queue (61) (using the extract max operation). It then deletes the request from the second priority queue (62) (using the delete operation) and issues the corresponding query to the mobile Network (70) via the Network Interface (65) component. As shown in FIG. 7, at a later time, when the response for this query comes back from the mobile Network (70), the DBS Processor (64) sends the response both to the CNDM (40), via the DNSG Components Interface (66), to cache the data, and to the Request Handler (30) to pass it back to the DNSG client (80). The DBS Server (60) also removes the trigger set for this particular client request in the CNDM (40) (which will have already fired, as discussed below).

As shown in FIG. 7, when the cache is updated in the CNDM (40), the triggers set by the Request Handler (30) for the updated data are fired (and cleared) and the DBS Server (60) is informed. These triggers correspond to other requests for the same piece of data requested by other un-served clients with lower priority. A separate Trigger Processor (63) inside the DBS Server (60) handles the triggers. When a trigger is fired in the CNDM (40), it passes to the Trigger Processor (63) the information about the client request that had set the trigger. The Trigger Processor (63) will remove the request from the priority queues (61) and (62). It then gets the requested data from the CNDM (40) and passes it to the Request Handler (30) via the DNSG Components Interface (66) component so that it can be sent back to the appropriate DNSG client (80).

The GLS Server

Figure 9:
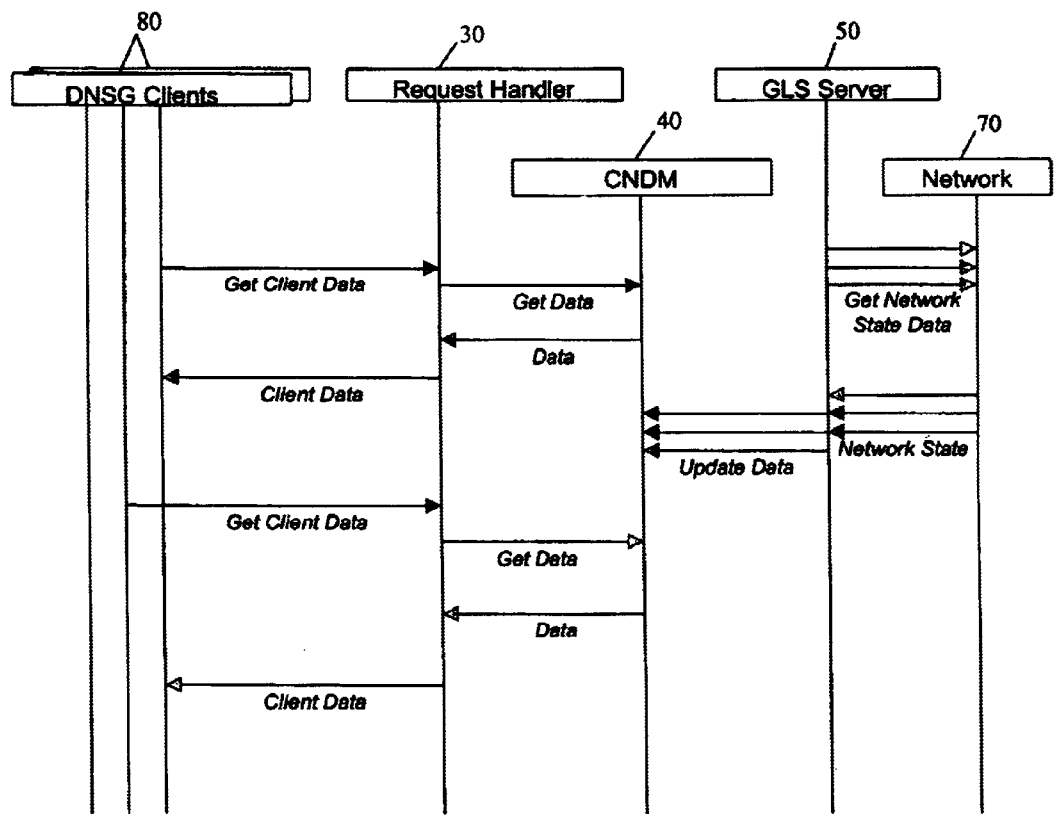
FIG. 9 is a flow diagram showing exemplary operation of a GLS server within the DNSG of FIG. 1.

With reference now to the flow diagram of FIG. 9, the implementation of the GLS Server (50) will be described. The GLS server (50) constructs a schedule (method described below) for querying the dynamic network state of the mobile subscribers (100). The network state of the mobile subscribers (100) obtained by these queries is cached into the CNDM (40). Any DNSG client request for a mobile subscriber's dynamic state with a GLS SLA is then served from this cache. By design of the GLS Server (50), the CNDM (40) is updated every "A" seconds with the current dynamic state of a mobile subscriber (100) who is offered a GLS SLA with age A. Therefore, the dynamic state served from the CNDM (40) for any DNSG client (80) for this mobile subscriber (100) is at most A seconds old.

Using the GLS Server (50), the DNSG (10) offers GLS SLAs to DNSG clients (80). As described earlier, for each DNSG client (80), the DNSG (10) maintains a list of mobile subscribers (100) who have authorized the DNSG client (80) to obtain their dynamic network state, and the SLA(s) offered to them by the DNSG client (80). Thus, the DNSG (10) knows, for each mobile subscriber (100), which DNSG clients (80) are authorized to access the mobile subscriber's network state and what GLS SLA(s) are to be offered to them for the subscriber queries. The DNSG (10) guarantees that all the SLAs are honored by ensuring that the GLS SLA with the highest priority among the ones associated with each mobile subscriber's queries is honored, since by assumption, the system can honor an SLA by honoring an SLA of equal or higher priority. The GLS server (50) thus maintains with every mobile subscriber (100) an associated highest priority GLS SLA (if it has one) which is the one with the highest priority among the GLS SLAs guaranteed to the DNSG client (80) for the mobile subscriber. A GLS SLA associated with the mobile subscriber provides a guarantee ensuring that:

All client queries for obtaining the dynamic network state of a mobile subscriber (100) with a GLS SLA are served within a maximal delay that is bounded by the specified latency and within an age (in terms of how far back the state was obtained from the mobile Network (70)) that is bounded by the specified precision of the SLA.

The number of client queries served for mobile subscribers (100) with GLS SLAs is not limited by the operator enforced control on the DNSG (10) for interfacing with the mobile Network (70), but only by the processing resources available to the DNSG (10).

It is assumed that all the GLS SLAs that are associated with the mobile subscribers (100) satisfy the feasibility conditions expressed below. These feasibility conditions should necessarily be satisfied by any system that offers a GLS SLA with the above-mentioned guarantees.

The first feasibility condition refers to the earliest age that can be offered for any GLS SLA. As indicated above, this earliest age has to be at least as much as the maximum network latency in obtaining the dynamic network state of a mobile subscriber (100), where the network latency is defined as the time between when the state is obtained by the mobile Network (70) and the time when it is delivered to the DNSG (10). This feasibility condition is necessary because the network latency is a lower bound on the earliest age that can be offered by any such system. Typically, the network latency will be in orders of milliseconds while the age will be in order of minutes, so this is not a limiting condition. For that reason, in the following it is assumed that the network latency is negligible.

The second feasibility condition refers to upper bound on the number of offered GLS SLAs, since this is limited by the operator imposed control on the resources available to interface with the mobile Network (70). Thus, let there be m distinct types of GLS SLAs associated with the mobile subscribers. Let these be denoted by $SLA_0$, $SLA_1$ ... where $SLA_j$ is denoted by $\{A_j, d_j\}$: $A_j$ is the guarantee on the age of the obtained network state in seconds and $d_j$ is the guarantee on the maximal delay for the query to obtain the network state. Let there be $n_j$ mobile subscribers (100) who are associated with a GLS SLA of type $SLA_j$. Let $N_1$ be the maximum number of queries per second that the DNSG (10) is allowed to issue to the mobile Network (70). Then note that the DNSG (10) must issue at least one network query in any interval of length $A_j$ for a mobile subscriber (100) who is associated with an SLA of type $SLA_j$, in order for the DNSG (10) to guarantee the offered GLS SLA to the mobile subscriber. This gives rise to the following feasibility condition:

(1) The Sum From 1 to m of the Ratio $n_j$ Over $A_j$ Must Not Exceed $N_1$

This condition follows because the summation over all of the GLS SLA types from 1 to m of the ratio $n_j$ over $A_j$ represents the number of network queries (assuming one query per mobile subscriber (100) with associated GLS SLA of type $SLA_j$ every $A_j$ seconds) that must be issued by the DNSG (10) to the mobile Network (70) in any interval of length one second for all of the m SLA types. For example, assume that the DNSG (10) offers m=3 types of GLS SLAs, respectively designated as $SLA_0$, $SLA_1$ and $SLA_2$. Type $SLA_0$ has $n_0$=60 subscribers who have contracted for a maximum age value $A_0$ of 1 minute (60 seconds). Type $SLA_1$ has $n_1$=120 subscribers who have contracted for a maximum age value $A_1$ of 2 minutes (120 seconds). Type $SLA_2$ has $n_2$=240 subscribers who have contracted for a maximum age value $A_2$ of 4 minutes (240 seconds). Assume further that the number of allowable GLS SLA queries per second, $N_1$, is 3. It will be seen that all of the GLS SLAs associated with types $SLA_0$, $SLA_1$ and $SLA_2$ can be satisfied because the $n_j/A_j$ ratio summation (for 1 through m) of $n_0/A_0+n_1/A_1+n_2/A_2=60/60+120/120+240/240=1+1+1=3$, which does not exceed $N_1$. Of course, it is assumed that the DNSG (10) has enough computational power and memory resources to process all the client requests efficiently.

Because the mobile subscribers (100) are associated with m distinct types of GLS SLA, which are $SLA_1$, $SLA_2$ ... where $SLA_j$ is denoted by $\{A_j, d_j\}$, and $A_j$ is the guarantee on the age of the obtained network state in seconds, and $d_j$ is the guarantee on the maximal delay for the query to obtain the network state, it can be shown that, for any $SLA_j$ offered by the DNSG (10), it is the case that $A_j$=k times $2^j$ for some fixed value k. Thus for GLS SLAs offered by the DNSG (10), the second feasibility can be rewritten as follows:

(2) The Sum From 1 to m of the Ratio $n_j$ over $2^j$ Must Not Exceed k Times $N_1$ As an example, assume again that the DNSG (10) offers 3 types of GLS SLAs, namely, a first GLS SLA type designated $SLA_0$ with age $A_0$=1 minute (60 seconds) and having $n_0$=60 mobile subscribers, a second GLS SLA type designated $SLA_1$ with age $A_1$=2 minutes (120 seconds) and having $n_1$=120 mobile subscribers, and a third GLS SLA type designated $SLA_2$ with age $A_2$=4 minutes (240 seconds) and having $n_2$=240 mobile subscribers. Note here that m=3 and assume that $N_1$=3 queries per second and k=60 seconds. The value $kN_1$=180. The $n_j/2^j$ summation (for 1 through m) of $n_0/2^0+n_1/2^1+n_2/2^2=60/1+120/2+240/4=60+60+60=180$, which does not exceed $kN_1$.

Assuming that a GLS SLA associated with a set of mobile subscribers (100) satisfies the above-described first and second feasibility conditions, the SLA server 50 can implement methods for scheduling the queries to the mobile Network (70) for the mobile subscribers (100). A method is first described for the case (Case 1) where k times $N_1$ is 1. Next, a second case (Case 2) is shown to illustrates how to use the method for Case 1 as a building block for implementing the method for the general case where k times $N_1$ is any arbitrary number.

The main idea is that the method determines how to schedule the queries to the mobile Network (70) to obtain the dynamic network state of all mobile subscribers (100) with a GLS SLA, such that if the GLS SLA guarantees that a mobile subscriber state is obtained with an age of A, then the network state of the mobile subscriber (100) is queried at regular intervals of length A seconds from the mobile Network (70). The following two cases describe examples of the method used by the GLS Server (50) for scheduling the network queries for the mobile subscribers with GLS SLAs.

Figure 10:
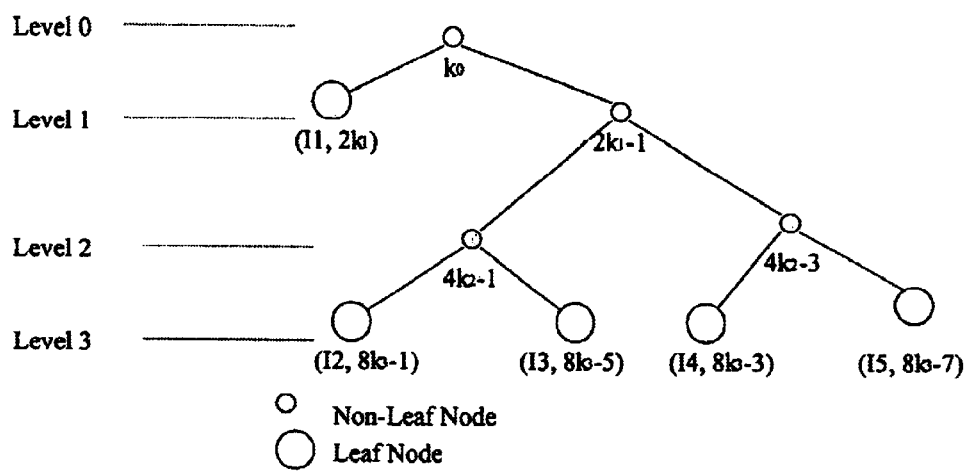
FIG. 10 is a diagram of a logical binary tree generated by the GLS server within the DNSG of FIG. 1.

Method for Case 1: The Sum From 1 to m of the Ratio $n_j$ Over $2^j$ is at Most $1(kN_1=1)$ To construct a query schedule according to this case, the method builds a binary tree of the type shown in FIG. 10 (described in more detail below). The dark nodes in FIG. 10 are non-leaf (branch) nodes, and the other nodes are leaf nodes. Each branch node is labeled with a time interval. Each leaf node is labeled with two things. One is the identity (ID) of exactly one of the mobile subscriber (100) who is offered a GLS SLA, and the second is the time period (in seconds) when the queries into the mobile Network (70) for the corresponding mobile subscriber are scheduled. Note that each time period is based on a multiple of the parameter k. This is done in the following manner.

Consider a complete binary tree consisting of levels 0 ... m−1, where the root node is at level 0. The children of the root node are at level 1, and their children are at level 2, and so on. The method starts with level 0 and makes its way down to level m−1, visiting the nodes of the binary tree in a left to right order at each level.

Consider the root node. This node is at level 0. Based on the GLS SLAs of the mobile subscribers (100), the method decides if the root is to be labeled as a leaf, and what label to use in that case. If the root node is labeled a leaf then the method ends. Otherwise the method visits the two nodes at level 1. For each node in this level, the method again decides if the node is to be labeled as a leaf, and what label to use in that case. If a node is labeled as a leaf, all the nodes which belong in a subtree rooted at this node are removed (i.e., none of them can be made a leaf). The method then repeats the process for the remaining nodes at level 2 that haven't been removed from the tree, and so on. Eventually, when there are only leaf nodes or when all the mobile subscribers (100) have been assigned to some leaf node, the method stops.

The method determines what label to use for a given leaf node based on the level of the leaf and the GLS SLAs of all the mobile subscribers (100) who have not been assigned to any leaf. This process will now be described in more detail.

A node at level l is considered to be associated with the number $2^l$, and is a potential candidate for being a leaf node labeled with the ID of a mobile subscriber (100) having a GLS SLA type with age $A_j=k2^l$. At any given time, the method decides if a node at level l is to be marked a leaf by checking if there are any unassigned mobile subscribers (who have not been assigned to any leaf) with a GLS SLA type with age $A_j=k2^l$. If there are none, then the node is not considered to be a leaf. On the other hand, if there is at least one unassigned mobile subscriber (100) (who has not been assigned to any leaf) with a GLS SLA type with age $A_j=k2^l$, the method marks the node as a leaf and labels it with the identity of the unassigned mobile subscriber. This mobile subscriber is now considered assigned.

So far, discussion has focused on how the method marks the nodes as leaves and labels the nodes with the identities of the mobile subscribers. The manner in which time periods are assigned to the nodes of the tree will now be described. The root (l=0) is assigned a time period of $2^0 k_0$, where $k_0$ is any positive number. For example, if $k_0=1$, the queries to the mobile Network (70) for any mobile subscriber (100) assigned to the root node are scheduled every 1 second. The left child of the root (l=1) is labeled with $2^l k_1$ and the right child (l=1) is labeled with $2^l k_1$. Here $k_l$ is any positive number. For example, if $k_l=1$, the queries to the mobile Network (70) for any mobile subscriber (100) assigned to the left child of the root note are scheduled every even second (2, 4, 6 ...) and every odd second for the right child (1, 3, 5, 7 ...). In general, if a parent node is assigned time periods that are determined as a function of $k_i$, then its left child is assigned time periods that are determined by the same function with $k_i$ replaced with $2k_{i+1}$, and the right child of the parent is assigned time periods which are determined by the same function with $k_i$ replaced with $2k_{i+1}-1$, where $k_{i+1}$ is a positive number.

This completes the description of the method for Case 1. The schedule thus constructed is used by the GLS server (50) to query the mobile Network (70) for the mobile subscriber's network state.

FIG. 10 shows a binary tree constructed according to Case 1 for an example where m=4, k=1, $n_0=0$, $n_1=1$, $n_2=0$ and $n_3=4$. There are 5 GLS SLAs for 5 mobile subscribers which have IDs: I1, I2, I3, I4, I5. Note that the root node at level 0 (l=0) of the binary tree is associated with age $A=2^0 k=1$. Because there are no GLS SLAs of age A=1, the root node cannot be a leaf node, and is therefore designated as a branch node and labeled with a time period $2^0 k_0 = k_0$.

Descending down to the level 1 of the binary tree (l=1), which is associated with age $A=2^l k=2$, it is seen that the mobile subscriber (100) with ID=I1 has an GLS SLA of type $SLA_1$ with an age A=2 seconds. This subscriber is thus assigned to the left-hand child of the root node and is scheduled for mobile network queries at $t=2k_1=2$ seconds, t=4 seconds, t=6 seconds, etc. Because there are no other subscribers with GLS SLAs having age A=2, the right-hand child of the root node is marked as a branch node and labeled with a time period $2^1 k_1 - 1$.

Descending down to the level 2 of the binary tree (l=2), which is associated with age $A=2^2 k=4$, it is seen that there are no mobile subscribers (100) having GLS SLAs of this type. Thus, both nodes in this level become branch nodes and are respectively labeled with time intervals $2^2 k_2 - 1$ and $2^2 k_2 - 3$.

Descending down to the final level 3 of the binary tree (l=3), which is associated with age $A=2^3 k=8$, it is seen that all of the other mobile subscribers (100) with IDs=I2, I3, I4 and I5 are associated with GLS SLAs of type $SLA_3$ having age $2^3 k=8$ seconds. These four subscribers are assigned to the four nodes at level 3, which therefore all become leaf nodes. Mobile subscriber I2 is scheduled for mobile network queries at 8 second intervals, starting with $t=8k_3-1=7$ seconds and repeating at t=15 seconds, t=23 seconds, etc. Mobile subscriber I3 is scheduled for mobile network queries at 8 second intervals, starting with $t=8k_3-5=3$ seconds and repeating at t=11 seconds, t=19 seconds, etc. Mobile subscriber I4 is scheduled for mobile network queries at 8 second intervals, starting with $t=8k_3-3=5$ seconds and repeating at t=13 seconds, t=21 seconds, etc. Mobile subscriber I5 is scheduled for mobile network queries at 8 second intervals, starting with $t=8k_3-7=1$ seconds and repeating at t=9 seconds, t=17 seconds, etc.

Figure 11:
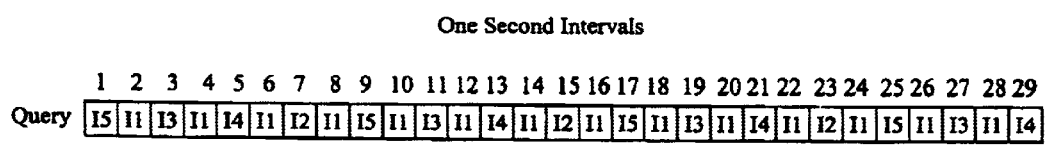
FIG. 11 is a tabular illustration of a mobile network query schedule corresponding to the binary tree of FIG. 10.

The query schedule for the example given above (and corresponding to the binary tree of FIG. 10) is shown in tabular form in FIG. 11. Each column represents a 1 second time interval and each row is a subscriber query. Note that there is 1 query per second. Note also that if $N_1$ is assumed to be 1, the method for Case 1 is satisfied. In particular, the $n_j/2^{j-1}$ ratio summation (for 1 through m) of $n_2/2^1 + n_4/2^3 = \frac{1}{2} + \frac{1}{8} = 1$, which does not exceed $kN_1 = 1$.

Method for Case 2: the Sum From 1 to m of the Ratio $n_j$ Over $2^j$ is Any Integer N=k times $N_1$ The method for this case works in much the same way as for Case 1, except that instead of using one binary tree, the method uses N binary trees that are each of maximum depth (levels) m. Thus, the method has N nodes at level 0 and 2N nodes at level 1 and so on. For these N binary trees, the method works exactly as the method for Case 1.

FIG. 12 shows the binary trees for an example where N=4, k=2 and $N_1=2$. In this example, assume there are 6 GLS SLAs for 6 mobile subscribers (100) having IDs I1, I2, I3, I4, I5 and I6. The mobile subscribers (100) with ID=I1 and ID=I2 are associated with GLS SLAs of type $SLA_1$ having age=2 seconds and all other mobile subscribers are associated with GLS SLAs of type $SLA_2$ with age=4. Note that in this case there are N=4 binary trees. Note that the Case 2 method is satisfied because the $n_j/2^j$ summation (for 1 through m) of $n_0/2^0 + n_1/2^1 = \frac{2}{1} + \frac{1}{2} = 4$, which does not exceed $N=kN_1=4$.

FIG. 13a shows an initial schedule created by the Case 2 method for this example. FIG. 13b shows a modified schedule generated by a post processing stage implemented by the GLS Server (50). Each column of FIGS. 13a and 13b represents a 1 second time interval and each row represents a subscriber query. The problem with the initial schedule of FIG. 13 is that there are 4 rows per column, which means that the GLS Server (50) has scheduled 4 queries per second. This violates the restriction that the mobile Network (70) will allow at most $N_1=2$ queries per second. The violation occurs because each of the 4 binary trees schedules its queries without regard to the other trees. Thus, there will be times when a query for each of the 4 binary trees is scheduled for the same 1 second time interval. The only constraint is that subscriber I3 will never be scheduled with subscriber I4, because they are scheduled by the same tree, and I5 will similarly never be scheduled with subscriber I6. However, subscribers I1, I2, I3 and I5 can all be scheduled together, as can subscribers I1, I2, I4 and I6. This is shown in the initial schedule of FIG. 13a.

To solve this dilemma, the aforementioned post processing stage is utilized where the initial schedule of FIG. 13a is stretched into the modified schedule of FIG. 13b, so that there are at most $N_1$ subscribers scheduled per second. The post processing stage is very straightforward, and involves replacing each 1 second interval (column) in the initial schedule of FIG. 13a by k second intervals. Then, the N subscriber queries assigned to certain 1 second intervals in the initial schedule are partitioned into k groups each of size at most $N_1$. Each group is assigned to one of the k second intervals in the modified schedule, as shown in FIG. 13b. Note that the scheduled queries satisfy each mobile subscriber's GLS SLA type. This post-processed schedule is used by the GLS Server (50) to query the Network (70) for the subscribers' network state.

Note that the GLS Server (50) also allows for dynamic updates in the supported GLS SLAs so that new registrations for GLS SLAs can be easily accommodated. When a new GLS SLA is to be registered, the GLS Server (50) checks for the feasibility conditions (described earlier) to make sure the GLS SLA can be honored. If it can, the GLS Server (50) finds a node in the N binary trees where the mobile subscriber (100) with the GLS SLA is to be assigned, and the time intervals at which the network state of this mobile subscriber is to be queried from the Network (70). The GLS SLA then uses the updated schedule.

Accordingly, a method and system have been disclosed for supporting differentiated network service for mobile customers and applications. While various embodiments of the invention have been shown and described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for obtaining a mobile subscriber's dynamic network state from a mobile communication network and making the dynamic network state available to a requesting entity that is a consumer of the network state information, comprising:

periodically issuing network queries to one or more mobile network resources to ascertain said mobile subscriber's dynamic network state;

providing information about said dynamic network state to said requesting entity based on a request for notification of changes in said mobile subscriber's network state, a request for said mobile subscriber's current network state, or both; and scheduling said network queries according to a Service Level Agreement (SLA) established with said requesting entity.

2. A method in accordance with claim 1 wherein said requesting entity is an application service provider offering services based on said mobile subscriber's dynamic network state and wherein said method further includes registration of said application service provider and provisioning to associate said application service provider with an application level SLA or a set of subscriber-selectable SLAs.

3. A method in accordance with claim 1 wherein said requesting entity is said mobile subscriber and wherein said method further includes registration of said mobile subscriber and provisioning to associate said mobile subscriber with an SLA.

4. A method in accordance with claim 2 wherein said requesting entity is an application service provider offering services based on said mobile subscriber's dynamic network state and wherein said method further includes a first registration of said application service provider and a first provisioning to associate said application service provider with a set of subscriber-selectable SLAs, and a second registration of said mobile subscriber and a second provisioning to associate one of said subscriber-selectable SLAs with said application service provider.

5. A method in accordance with claim 1 wherein said SLA is defined in terms of a Quality of Service (QoS) representing a speed at which said mobile subscriber's dynamic network state is to return following a request therefor, and a precision in terms of age of the obtained dynamic network state.

6. A method in accordance with claim 5 wherein said SLA is one of several SLAs established with a plurality of requesting entities, and wherein said SLAs collectively provide differentiated levels of service to said plurality of requesting entities in accordance with mobile network resource limitations.

7. A method in accordance with claim 6 wherein said SLA is a differentiated best services (DBS) SLA that is used to offer a service that may degrade with increases in demand from said plurality of requesting entities and for which it is guaranteed that overall increases in said requests from requesting entities having DBS SLAs of equal quality can only deteriorate quality of requesting entities having DBS SLAs of lower quality.

8. A method in accordance with claim 7 wherein said requests from requesting entities having DBS SLAs are prioritized according to said age value and wherein said request is satisfied if said mobile subscriber dynamic network state sought by said request can be obtained within a time specified by said age value of said DBS SLA and wherein an exception is issued if said mobile subscriber dynamic network state sought by said request cannot be obtained within a time specified by said age value.

9. A method in accordance with claim 6 wherein said SLA is a guaranteed level of service (GLS) SLA that is used to guarantee that all of said requests having GLS SLA service will be satisfied irrespective of increases in demand from said plurality of requesting entities.

10. A method in accordance with claim 9 wherein said requests from requesting entities having GLS SLAs are scheduled according to the number of said requesting entities having GLS SLAs and said age values associated with said GLS SLAs.

11. A system for obtaining a mobile subscriber's dynamic network state from a mobile communication network and making said dynamic network state available to a requesting entity (mobile subscriber or application) that is a consumer of the information, comprising:

means for periodically issuing network queries to one or more mobile network resources to ascertain said mobile subscriber's dynamic network state;

means for providing information about said dynamic network state to said requesting entity based on a request for notification of changes in said mobile subscriber's network state, a request for said mobile subscriber's current network state, or both; and means for scheduling said network queries based on consideration of mobile network resource limitations and according to a Service Level Agreement (SLA) established with said requesting entity.

12. A system in accordance with claim 11 wherein said requesting entity is an application service provider offering services based on said mobile subscriber's dynamic network state and wherein said system further includes registration means for registering said application service provider and provisioning means for associating said application service provider with an application level SLA or a set of subscriber-selectable SLAs.

13. A system in accordance with claim 11 wherein said requesting entity is said mobile subscriber and wherein said system further includes registration means for registering said mobile subscriber and provisioning means for associating said mobile subscriber with an SLA.

14. A system in accordance with claim 12 wherein said requesting entity is an application service provider offering services based on said mobile subscriber's dynamic network state and wherein said system further includes first registration means for registering said application service provider and first provisioning means for associating said application service provider with a set of subscriber-selectable SLAs, and second registration means for registering said mobile subscriber and second provisioning means for associating one of said subscriber-selectable SLAs with said application service provider.

15. A system in accordance with claim 11 wherein said SLA is defined in terms of a Quality of Service (QoS) representing a speed at which said mobile subscriber's dynamic network state is to return following a request therefor, and a precision in terms of age of the obtained dynamic network state.

16. A system in accordance with claim 15 wherein said SLA is one of several SLAs established with a plurality of requesting entities, and wherein said SLAs collectively provide differentiated levels of service to said plurality of requesting entities in accordance with mobile network resource limitations.

17. A system in accordance with claim 16 wherein said SLA is a differentiated best services (DBS) SLA that is used to offer a service that may degrade with increases in demand from said plurality of requesting entities and for which it is guaranteed that overall increases in said requests from requesting entities having DBS SLAs of equal quality can only deteriorate quality of requesting entities having DBS SLAs of lower quality.

18. A system in accordance with claim 17 wherein said requests from requesting entities having DBS SLAs are prioritized according to said age value and wherein said system includes request handling means for satisfying said request if said mobile subscriber dynamic network state sought by said request can be obtained within a time specified by said age value of said DBS SLA and for issuing an exception if said mobile subscriber dynamic network state sought by said request cannot be obtained within a time specified by said age value.

19. A system in accordance with claim 16 wherein said SLA is a guaranteed level of service (GLS) SLA that is used to guarantee that all of said requests having GLS SLA service will be satisfied irrespective of increases in demand from said plurality of requesting entities.

20. A system in accordance with claim 19 wherein said system includes a request handler for handling requests from requesting entities having GLS SLAs by scheduling according to the number of said requesting entities having GLS SLAs and said age values associated with said GLS SLAs.

21. A differentiated network service gateway (DNSG) for obtaining a mobile subscriber's dynamic network state from a mobile communication network and making said dynamic network state available to a requesting entity (mobile subscriber or application) that is a consumer of the information, comprising:

a provisioning interface;

a registration server accessed by said provisioning interface for registering DNSG clients;

a registration database storing for each registered DNSG client a client identifier, a mobile subscriber identifier, and a service level agreement (SLA) quality of service identifier;

a request handler adapted to receive requests from said DNSG clients and return dynamic network state information for a mobile subscriber;

a cached network data module (CNDM) storing retrieved mobile subscriber dynamic state information on behalf of said request handler;

a differentiated best services (DBS) server adapted to prioritize requests from said request handler based on a quality of service associated with a requesting DNSG client having a DBS SLA and to issue network queries to one or more mobile network resources to ascertain said mobile subscriber dynamic network state information; and a guaranteed level services (GLS) server adapted to schedule network queries based said a quality of service associated with a requesting DNSG client having a GLS SLA and to periodically issue queries to said one or more mobile network resources to ascertain said mobile subscriber dynamic network state information.

* * * * *